(12) United States Patent
Bloemenkamp et al.

(10) Patent No.: US 9,921,337 B2
(45) Date of Patent: Mar. 20, 2018

(54) METHOD AND SYSTEM FOR CALIBRATING A DOWNHOLE IMAGING TOOL

(71) Applicant: Schlumberger Technology Corporation, Sugar land, TX (US)

(72) Inventors: Richard Bloemenkamp, Issy-les-Moulineaux (FR); Laetitia Comparon, Malakoff (FR); Andrew Hayman, Voisins-le-Bretonneux (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 307 days.

(21) Appl. No.: 14/759,418

(22) PCT Filed: Jan. 10, 2014

(86) PCT No.: PCT/US2014/010996
§ 371 (c)(1),
(2) Date: Jul. 7, 2015

(87) PCT Pub. No.: WO2014/110338
PCT Pub. Date: Jul. 17, 2014

(65) Prior Publication Data
US 2015/0355372 A1    Dec. 10, 2015

Related U.S. Application Data

(60) Provisional application No. 61/751,471, filed on Jan. 11, 2013.

(30) Foreign Application Priority Data

Jan. 11, 2013    (EP) .................................... 13305020

(51) Int. Cl.
*G01V 13/00* (2006.01)
*G01V 3/20* (2006.01)
*G01V 3/24* (2006.01)

(52) U.S. Cl.
CPC ................ *G01V 13/00* (2013.01); *G01V 3/20* (2013.01); *G01V 3/24* (2013.01)

(58) Field of Classification Search
CPC combination set(s) only.
See application file for complete search history.

(56) References Cited

U.S. PATENT DOCUMENTS 7,095,233 B1    8/2006 Tabanou et al.
7,689,363 B2 *  3/2010 Itskovich ................. G01V 3/20
                                                              175/50

(Continued)

FOREIGN PATENT DOCUMENTS

WO    WO 2012085725 A1 *  6/2012  ............... G01V 3/24

OTHER PUBLICATIONS

E.I. Organick, "A fortran IV Primer," Addison-Wesley 1966, p. 42.
(Continued)

*Primary Examiner* — Telly Green
(74) *Attorney, Agent, or Firm* — Michael Dae

(57) ABSTRACT

System and methods of generating calibrated downhole images of a subterranean formation (110) surrounding a wellbore (105). The method involves placing a pad at a distance from a highly conductive surface and measuring a current between return electrodes of the pad and the highly conductive surface. The current may be used to determine a theoretic impedance of the current path, and impedance amplitude and impedance phase may be calibrated using theoretical impedance phase and theoretical impedance amplitude. Multiple standoff calibrations and temperature variation calibrations may also be used.

10 Claims, 6 Drawing Sheets

(56) References Cited

U.S. PATENT DOCUMENTS

| | | | | |
|---|---|---|---|---|
| 8,301,384 B2* | 10/2012 | Forgang | ............... | G01V 3/24 |
| | | | | 324/347 |
| 9,400,339 B2* | 7/2016 | Bloemenkamp | ......... | G01V 3/24 |
| 2005/0179437 A1 | 8/2005 | Hayman et al. | | |
| 2007/0007967 A1 | 1/2007 | Itskovich et al. | | |
| 2008/0288171 A1 | 11/2008 | Itskovich et al. | | |
| 2011/0035153 A1 | 2/2011 | Forgang et al. | | |
| 2011/0114309 A1 | 5/2011 | Bloemenkamp et al. | | |
| 2013/0293234 A1* | 11/2013 | Bloemenkamp | ......... | G01V 3/24 |
| | | | | 324/355 |
| 2013/0293235 A1* | 11/2013 | Bloemenkamp | ......... | G01V 3/24 |
| | | | | 324/356 |
| 2014/0347056 A1* | 11/2014 | Hayman | ............... | E21B 47/00 |
| | | | | 324/355 |

OTHER PUBLICATIONS

Extended European search report for the equivalent European patent application No. 13305020.3 dated Jul. 26, 2013.

\* cited by examiner

METHOD AND SYSTEM FOR CALIBRATING A DOWNHOLE IMAGING TOOL

BACKGROUND

The present disclosure relates to techniques for performing formation evaluation. More particularly, the present disclosure relates to techniques, such as calibrations, that may be used in performing measurement, imaging and/or other formation evaluations.

To locate and capture valuable hydrocarbons from subterranean formations, various wellsite tools may be used to perform various tasks, such as drilling a wellbore, performing downhole testing and producing downhole fluids. Downhole drilling tools may be advanced into the earth by a drill string with a bit at an end thereof to form the wellbore. Drilling muds (or other drilling fluids) may be pumped into the wellbore and through the drilling tool as it advances into the earth. The drilling muds may be used, for example, to remove cuttings, to cool the drill bit and/or to provide a coating along the wellbore. The drilling muds may be conductive or non-conductive drilling fluids (e.g., oil based muds (OBM), water based muds (WBM), etc.) During or after drilling, casing may be cemented into place to line a portion of the wellbore, and production tools may be used to draw the downhole fluids to the surface.

During wellsite activities, downhole measurements may be taken to collect information about downhole conditions. The downhole measurements may be taken of various wellsite parameters, such as temperature, pressure, permittivity, impedance, resistivity, gain factor, button standoff, impedance phase offset, etc. Downhole tools, such as the drilling tool, a testing tool, a production tool, or other tools, may be deployed into the wellbore to take the downhole measurements, such as formation resistivity. These downhole measurements may be used to generate downhole parameters, such as impedance of electrodes used in taking the downhole measurements, vectors of the impedance, and the length of such vectors (e.g., Z90). In some cases, downhole logs, images or other outputs may be generated from the downhole measurements.

BRIEF SUMMARY

This disclosure relates to techniques for calibrating downhole measurements. The techniques involve measurements in cased and open hole wellbores that may be used to cross-check sensor measurements and/or to determine cased and open hole impedances. This information may be used to calculate Z90 and/or generate calibrated downhole images (or other outputs).

In one aspect, the disclosure relates to a method of generating calibrated downhole images of a subterranean formation surrounding a wellbore. The method may involve positioning a pad of a downhole tool at a distance from a conductive surface, measuring a current at the pad, and determining the theoretic impedance of the current path based on the measured current and the distance between the pad and the conductive surface. In some embodiments, the pad may be suitable for measuring downhole parameters and may have one or more return electrodes. The current may be measured from a current path between one or more of these return electrodes and the conductive surface of the pad.

The cased hole impedance may include a button impedance and/or a mud impedance. A measured button impedance may equal a real button impedance. The cased hole impedance has an amplitude, a magnitude, a phase, and an angle. The known parameters may include a casing curvature, a sensor pad curvature, standoff, and/or mud angle. A curvature mismatch may exist between the casing curvature and the sensor pad curvature, and adjustments may be made therefor. The cased hole parameters may include a mud angle, a mud permittivity, a standoff, a gain factor, an impedance phase offset, and/or an amplitude offset. The open hole parameters may include an open hole amplitude and/or an open hole phase.

In another aspect, the disclosure relates to a system for generating calibrated downhole images of a subterranean formation surrounding a wellbore. The system may have a downhole tool positionable in a wellbore. The downhole tool may have at least one sensor pad for measuring downhole parameters, at least one button electrode and at least one return electrode on the sensor pad, and electronics in communication with the button electrode and the return electrode. The electronics obtain cased hole measurements in a cased hole portion of the wellbore and open hole measurements in an open hole portion of the wellbore with the sensor pad, and determine cased hole parameters (e.g., Z90) from the cased hole measurements and open hole parameters from the cased hole parameters, known parameters and the open hole measurements. For example, the open hole parameters may include theoretical impedance.

The system may also have at least one guard electrode between the button electrode and the return electrode, at least one wear plate extending from a front fact of the sensor pad, and/or an electrically insulated material along a front face of the sensor pad with the button electrode and the electrode positionable therein. A front face of the sensor pad has a curvature with each of the button electrodes positionable along the curvature. The sensor pad is positionable against a measurement surface via at least on leg.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of methods for calibration a downhole imaging tool are described with reference to the following figures. The same numbers are used throughout the figures to reference like features and components.

FIG. 1-2 illustrates a schematic view, partially in cross-section, of a portion 1-2 of the wellsite of FIG. 1-1 depicting one of the sensor pads in greater detail.

FIG. 2-1 illustrates a top view, partially in cross-section, of a portion of the wellsite of FIG. 1-1 taken along line $2_1$-$2_1$ depicting known parameters of the wellsite.

FIG. 2-2 illustrates a top view, partially in cross section, of a portion of the wellsite of FIG. 1-1 taken along line $2_2$-$2_2$ depicting various known parameters of the sensor pad.

DETAILED DESCRIPTION

The description that follows includes example apparatuses, methods, techniques and instruction sequences that embody techniques of the present subject matter. However, it may be understood that the described embodiments may be practiced without these specific details.

The techniques described herein may be used to generate calibrated downhole outputs, such as downhole images, logs, etc. The methods involve determining downhole parameters, such as impedance and Z90, from downhole measurements. The downhole measurements may be taken by downhole tools with sensor pads positioned in cased and open hole portions of a wellbore. The cased hole and open hole measurements may be used with known parameters (e.g., casing dimensions, sensor pad dimensions, etc.) to reduce error that may be caused by measurement variations, such as raw phase offset, phase button variation, mud angle (sometimes referred to as 'loss tangent'), amplitude button variation, mud permittivity, sensor variations, curvature mismatch, etc.

Figure 1:
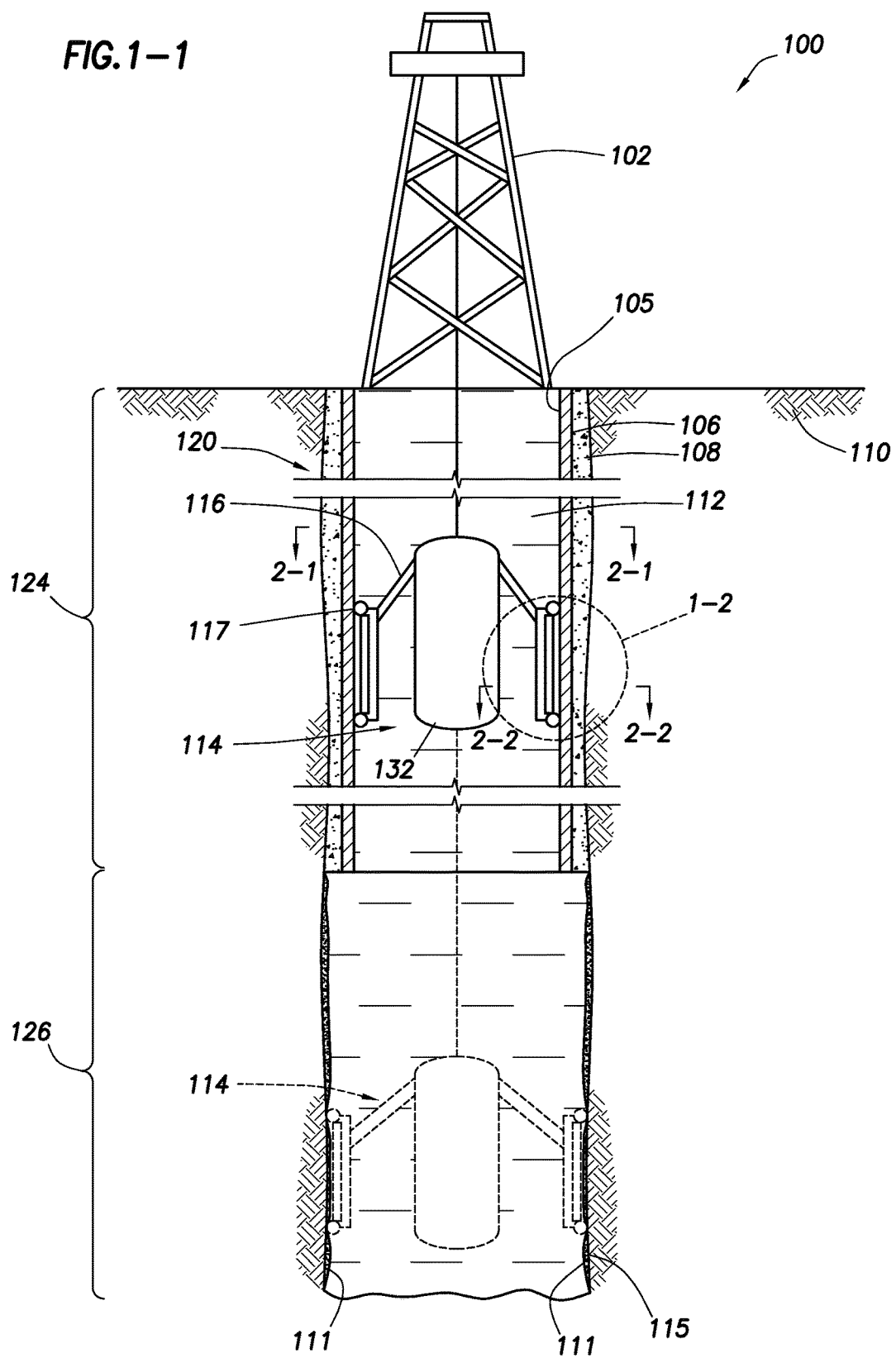
FIG. 1-1 illustrates a schematic view, partially in cross-section, of a wellsite having a downhole tool with a sensor pads for taking downhole measurements in which embodiments of methods for calibration can be implemented.

FIG. 1-1 is a schematic view of a wellsite 100 having a rig 102 positioned over a wellbore 105 penetrating a subterranean formation 110. While the rig 102 in FIG. 1-1 is shown as being land-based, it will be appreciated that the rig 102 could be at an offshore location. The wellbore 105 may be created using a drilling tool (not shown). During drilling, a drilling mud 112 may be pumped downhole to facilitate the drilling process. As a result, a layer of mud 111 (or mud cake) may form on a wall 115 of the wellbore 105. The mud 111 may be an oil or water based mud. A metal casing 106 may then be cemented along the wall 115 with a cement 108, thereby defining a cased hole portion 124 of the wellbore 105 adjacent the casing 106 and an open hole portion 126 therebelow.

A downhole tool 114 may be lowered into the wellbore 105 to take downhole measurements. The downhole tool 114 is depicted as a wireline imaging tool with sensor pads 117, but may be any downhole tool, such as a micro-imager capable of taking downhole measurements (e.g., resistivity) in oil or water based mud. The downhole tool 114 may be a conventional resistivity tool used to generate images as described, for example, in US Patent Application No. 2011/0114309.

As depicted in FIG. 1-1, the downhole tool 114 has a body 132 (or mandrel) with a plurality of spaced arms 116 extending therefrom. Each arm 116 has the sensor pad 117 operatively attached to an end thereof. One or more sensor pads 117 may be positioned about the downhole tool 114, e.g., on arms 116 and/or mandrel 132. The sensor pads 117 may be selectively extendable from the mandrel 132 via the arms 116 for taking downhole measurements of the formation 110 surrounding the wellbore 105.

The downhole tool 114 may be positioned at various locations along the wall 115 of the wellbore 105 for taking downhole measurements. The downhole tool may be lowered into a cased position in the cased hole portion 124 of the wellbore 105 (shown in solid line), and/or into an open hole position in the open hole portion 126 of the wellbore 105 (shown in dashed line). In some cases, the downhole tool 114 may be lowered to a calibration position near a bottom of the cased hole portion 124 adjacent the open hole portion 126 of the wellbore. Due to the proximity between the cased hole portion 124 and open hole portion 126, the calibration position may be a location where the downhole tool 114 has roughly the same environmental conditions as a top portion of the open hole portion 126.

Figures 1, 2:
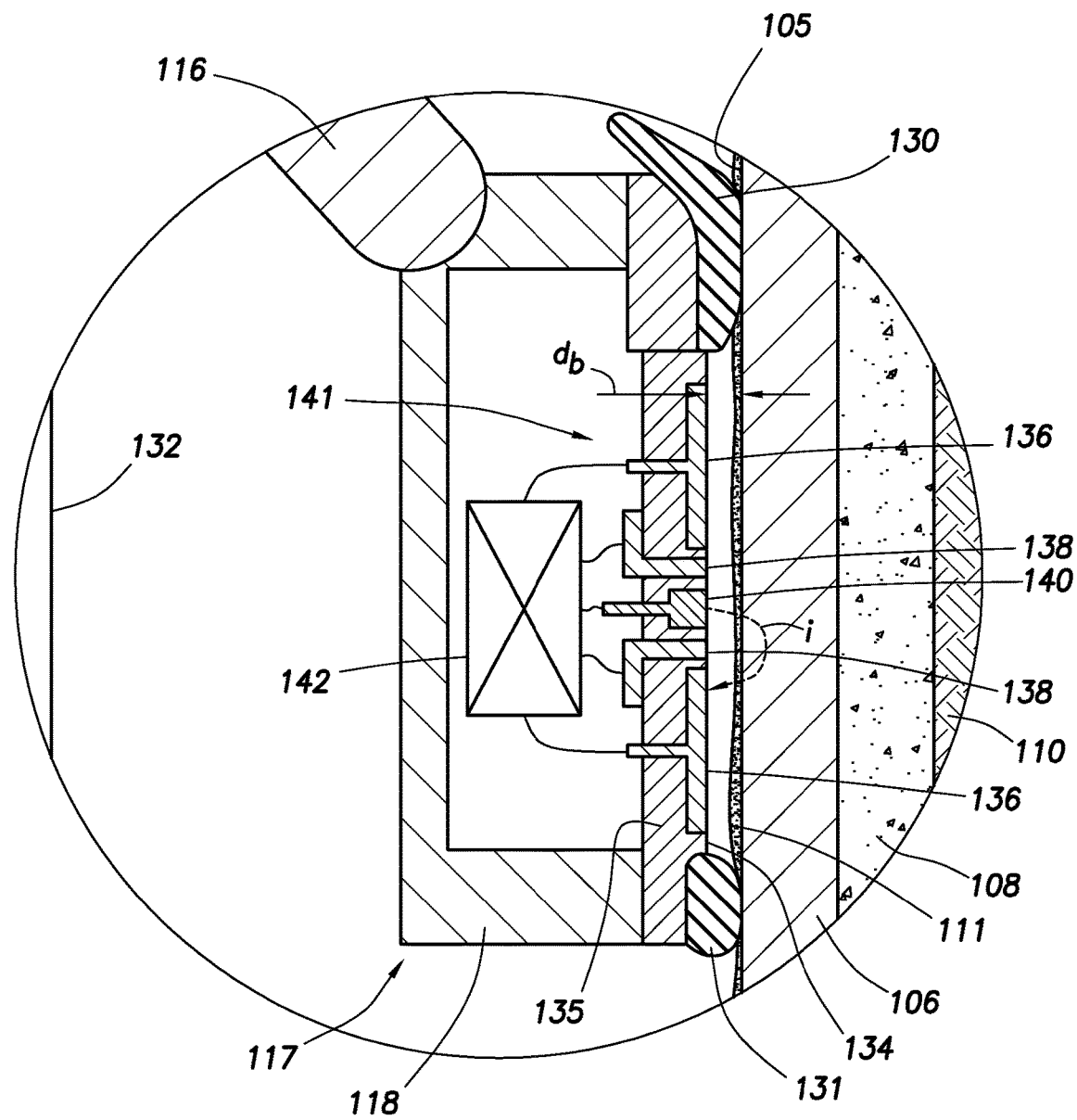
Figures 1, 2:
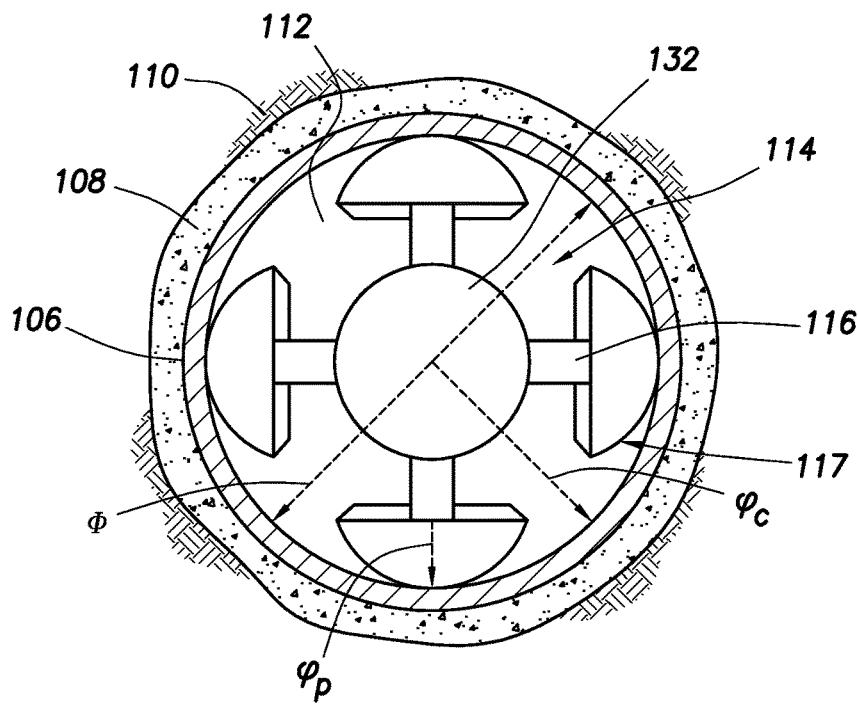

FIG. 1-2 shows a cross-sectional view of the sensor pad 117 of FIG. 1. While the sensor pad 117 is shown as being in a cased hole portion 124 and positioned against casing 106, it may be anywhere in the wellbore 105 and positionable against any measurements surface (e.g., mud 111, casing 106, wall 115, etc.) The sensor pad 117 is shown having a pad body 118 with an electrode package 141 therein. The pad 117 may have a face 134 positionable along the casing 106 of the wellbore 105. A portion of the face 134 may be made of an electrically insulated material 135.

To protect the pad 117 and to keep the face 134 from touching the casing 106 (or the wall 115), the sensor pad 117 may be provided with an upper wearplate 130 and a lower wearplate 131 at upper and lower ends, respectively, thereof. The wearplates 130, 131 may protrude a distance (or standoff) $d_b$ from the front face 134 to prevent direct contact between the front face 134 and the casing 106. When a measurement is desired, the arms 116 may be selectively extended to a position where the pad 117 is flushably pressed against the casing 106 (or the wall 115).

The electrode package 141 includes a button electrode 140 at least one return electrode 136 and at least one guard electrodes 138. Return and guard electrodes may be on either side of at least one button electrode. The electrode package 141 may optionally include one or more button electrodes 140, return electrodes 136, guard electrodes 138, and/or other electrode capable of taking the desired downhole measurements through drilling mud (oil or water based) and /or formations. The electrode package 141 is operatively connected to electronics 142 positioned within the pad body 118. While the electronics 142 is depicted as being in the sensor pad 117, at least a portion of the electronics 142 may be positioned in the arms 116 and/or the mandrel 132 of the downhole tool 114.

As shown in FIG. 1-2, the button electrode 140 emits a current i that passes through the drilling mud 111 and through the casing 106 and is received by the return electrodes 136. The drilling mud may have electrical parameters that may vary over a wide range. Oil-based muds may have a relative dielectric permittivity between about 2 and about 40 depending, for example, on the oil-water ratio of the mud. A mud impedance angle of oil-based mud may be in a range of between about −90 and about −45 degrees depending on oil-water ratio, temperature and additives. This mud impedance angle range may correspond to a loss tangent between about 0.00 and about 1.00. When in the open hole position (e.g., 124 of FIG. 1-1), the button electrodes 140 emits a current that passes through the drilling mud 111 and/or the formation 110.

FIG. 2-1 shows a top view of the downhole tool 114 with four arms 116 extended such that four sensor pads 117 are positioned against the casing 106. One or more arms 116 and sensor pads 117 may be positioned at various positions relative to the downhole tool 114 (evenly or unevenly). Also shown are various downhole geometries, such as the casing diameter Φ (which may be between about 3 inches (7.62 cm) to 28 inches (71.12 cm)), a pad curvature radius $\varphi_p$ and a casing curvature radius $\varphi_c$ (which may be between about 1.5 inches (3.81 cm) and 14 inches (35.56 cm)). These and other known or measureable downhole geometries may be used in the determination of various downhole parameters.

FIG. 2-2 shows a cross-sectional view of one of the sensor pads 117 in the measurement position against the casing 106. As shown in this view, the sensor pad 117 may have multiple electrode packages 241 along the front face 134. This view also shows additional downhole geometries, such as a button standoff $d_{b1-13}$, the distance from each set of electrodes 241 to the casing 106 (or the wall 115 when in the open hole portion 126 of the wellbore 105 as shown in FIG. 1). The number of buttons may vary, for example, as a function of pad width and image resolution requirements. The button standoff $d_{b1-13}$ for each of the electrode packages 241 may vary depending on the pad curvature radius $\varphi_p$ relative to the casing curvature radius $\varphi_c$. A range for the standoff may be between about 0.10 and 30.00 mm. For standoff values outside this range the quality of the measurement may be degraded. The standoff may be within this range for at least a large portion of a log taken by the downhole tool. For standoff values smaller than about 0.10 mm, the measurement may become unstable; for standoff values above about 30 mm the resolution and/or sensitivity may degrade.

As shown, the button standoff $d_{b1}$ for the electrode package(s) 241 closest to the casing 106 (or wall of the wellbore) may be approximately the same as the wear plate standoff $d_b$ of the wear plate 131. Due to the pad curvature radius $\varphi_p$, the button standoff $d_{b2-13}$ for the electrode packages on either side of the standoff $d_b$ increases towards either end of the pad 117.

The downhole measurements taken by the sensor pads 117 in the cased and open hole positions and the known downhole geometries may be used to determine various downhole parameters and/or to generate downhole images (or other outputs). Various factors, such as electrical properties of the mud, offsets of the measurement electronics or other measurement factors, may affect the quality of the measurements and the resulting images generated therefrom. The methods herein are configured to 'calibrate' the measurements based on control measurements taken in cased hole portion 124 of the wellbore and the factors which may affect measurements.

Determining Impedances and Z90

Impedances of the button electrode 140 and the drilling mud 111 trapped between the wall 105 of the wellbore and the sensor pad 117 may be determined from downhole measurements. The button impedances may be used to determine various parameters, such as Z90. A vector of the button impedance in a complex plane can be decomposed into two orthogonal vectors: a first vector in the direction of the mud impedance vector, and a second vector orthogonal to the direction of the mud impedance vector. Z90 is a length of the second vector. In some cases, Z90 may be used as a measure of formation resistivity that may be independent of other parameters, such as standoff and rugosity.

Referring to FIG. 2-2, to obtain the impedances, the sensor pad 117 of the downhole tool may be used to pass currents from the button electrode 140 through the casing 106 (when in the cased hole portion 124) or the formation 110 (when in the open hole portion 126). A source (e.g., electronics 142) may generate a voltage between the return electrode 136 and the button electrode 140 with at least one spectral component in a frequency range between about a 100 kHz and about 100 MHz. The range of generated voltages may be range from about 0.10 mV to about 1000V depending on the required image quality and the resistivity of the formation and the geometry of the pad (e.g., the electrodes). Voltages below the indicated lower limit may result is noisy images, voltages above the upper limit may give rise to mud stability problems and excessive tool power consumption. The voltage between the return electrode 136 and the button electrode 140 may result in a measurement current exchange therebetween and, due to the small stand-off compared to the distance between the two electrodes and due to the conductivity of the casing 106, the current starts from the button electrode 140, penetrates through the mud 111 layer, and passes into the casing 106.

The current will then run towards the return electrode 136 where the current will leave the casing 106, penetrate through the mud 111 in front of the sensor pad 117 and terminate at the return electrode 136 as indicated by the dashed arrow. As the current is alternating the current may run the opposite way or may run both ways at different points in time. The button current may be in the range of between about 10 nA and 100 mA. Currents below the indicated lower limit may result is noisy images, and currents above the upper limit may give rise to excessive tool power consumption.

The button current together with the return-button voltage, defines a button impedance (Z button):

$$Z\_button = V\_return / I\_button \; [Ohm] \quad \text{Equation (1)}$$

The equations herein may be identified as being based on various parameters, such as resistance [Ohms], voltage [V], current (or amps) [A], capacitance [F], and frequency [rad]. The button impedance (Z_button), the return voltage (V_return) and the button current (I_button) are complex phasors having a magnitude and a phase shift which can be expressed as:

$$Z\_button = abs(Z\_button) * \exp(i*angle(Z\_button)) \; [Ohm] \quad \text{Equation (2)}$$

$$V\_return = abs(V\_return) * \exp(i*angle(V\_return)) \; [V] \quad \text{Equation (3)}$$

$$I\_button = abs(I\_button) * \exp(i*angle(I\_button)) \; [A] \quad \text{Equation (4)}$$

where the absolute value for Z_button, V_button and I_button are functions that give the magnitude of the signal for Z_button, V_button and I_button, and the angle for Z_button, and V_button and I_button is a function that gives the phase angle of the signal for Z_button, V_button and I button (e.g. in the interval [−pi, pi]). Angle ( ) may be based on a function y=angle(x) which is defined as the function y=atan2(imag(x),real(x)) where the atan2( ) function is defined in Organick, Elliott I, A Fortran IV Primer, Addison-Wesley. pp. 42 (1966). Some processors may also offer a library function called ATAN2, a function of two arguments (opposite and adjacent). The function imag( ) gives an imaginary part of the complex variable x and the function real( ) gives a real part of the complex variable x. The function y=abs(x) may be defined a function y=sqrt(imag(x)2+real(x)2), where sqrt( ) denotes the usual square root function. Written out as full equations the following may be provided:

$$Z\_button = V\_return/I\_button = abs(V\_return)*\exp(i*angle(V\_return))/abs(I\_button) \; [Ohm] \quad \text{Equation (5)}$$

$$*\exp(i*angle(I\_button)) = abs(V\_return)/abs(I\_button) * \; [Ohm] \quad \text{Equation (6)}$$

$$\exp(i*\{angle(V\_return) - angle(I\_button)\}) \; [Ohm] \quad \text{Equation (7)}$$

which shows that the button impedance magnitude is the ratio of the return voltage amplitude and the button current amplitude, while the button impedance phase is the difference between the return voltage phase and the button current phase as shown in Equations (8) and (9):

$$abs(Z\_button) = abs(V\_return)/abs(I\_button) \; [Ohm] \quad \text{Equation (8)}$$

$$angle(Z\_button) = angle(V\_return) - angle(I\_button) \; [rad] \quad \text{Equation (9)}$$

Z_button may be considered to be a measurement taken by, for example, the sensor pad 117 and/or downhole tool 114.

Z90 may be determined from the impedances while taking into account potential sensitivities which may cause measurement error. For example, if the mud impedance angle is incorrectly estimated, then the Z90 quantity can become sensitive to the standoff $d_b$. If $\Delta$angle(Z_mud) is the estimated mud impedance angle minus the real mud impedance, then:

$$\Delta\text{angle}(Z\_mud)=\text{angle\_estimated}(Z\_mud)-\text{angle}(Z\_mud) \text{ [rad]} \quad \text{Equation (10)}$$

Performing a similar calculation as above generates the following:

$$Z90=\text{abs}(Z\_button)*\sin[\text{angle}(Z\_button)-\text{angle\_estimated }(Z\_mud)][\text{Ohm}] \quad \text{Equation (11)}$$

which shows that $$Z90=\text{abs}(Z\_mud)*\sin\{-\Delta\text{angle}(Z\_mud)\}+\text{abs}(Z\_form)*\sin\{\text{angle}(Z\_form)-\text{angle}(Z\_mud)-\Delta\text{angle}(Z\_mud)\}[\text{Ohm}] \quad \text{Equation (12)}$$

The above equations show that, given some difference between the estimated mud angle and the real mud angle, the Z90 quantity can become sensitive to the amplitude of the mud impedance abs(Z_mud) since the first term on the right is not zero. Because the amplitude of the mud impedance may be dependent on standoff, the Z90 quantity can also be dependent on standoff. Thus, an estimation of the mud angle (angle(Z_mud)) may be used in the determination of Z90.

Z90 may also be affected by incorrect measurement phase angle. If either or both of the phase of the return voltage measurement and the phase of the button current measurement have an error or offset, then the phase angle of the button impedance (angle(Z_button)) can have an error (assuming the two errors do not cancel). The effect on the measure Z90 may be the same whether an offset or error is in one of the other or both (except for the sign). Assuming the following:

$$\Delta\text{angle}(Z\_button)=\text{angle\_measured}(Z\_button)-\text{angle}(Z\_button) \text{ [rad]} \quad \text{Equation (13)}$$

then it follows that:

$$Z\_button\_measured=\text{abs}(Z\_button)*\exp\{i*\text{angle\_measured}(Z\_button)\} \text{ [Ohm]} \quad \text{Equation (14)}$$

$$=\text{abs}(Z\_button)*\exp\{i*\text{angle}(Z\_button)\}*\exp\{i*\Delta\text{angle}(Z\_button)\} \text{ [Ohm]} \quad \text{Equation (15)}$$

$$=Z\_button*\exp\{i*\Delta\text{angle}(Z\_button)\} \text{ [Ohm]} \quad \text{Equation (16)}$$

$$=(Z\_mud+Z\_formation)*\exp\{i*\Delta\text{angle}(Z\_button)\} \text{ [Ohm]} \quad \text{Equation (17)}$$

Performing a similar calculation Z90 may be generated as follows:

$$Z90=\text{abs}(Z\_button)*\sin[\text{angle\_measured}(Z\_button)-\text{angle}(Z\_mud)] \text{ [Ohm]} \quad \text{Equation (18)}$$

Z90 may be rewritten as follows:

$$Z90=\text{abs}(Z\_mud)*\sin\{\Delta\text{angle}(Z\_button)\}+\text{abs}(Z\_form)*\sin\{\text{angle}(Z\_form)+\Delta\text{angle}(Z\_button)-\text{angle}(Z\_mud)\}. \text{ [Ohm]} \quad \text{Equation (19)}$$

This shows that, given some difference between the measured phase of the button impedance and the real phase of the button impedance, the Z90 quantity can become sensitive to the amplitude of the mud impedance abs(Z_mud) since the first term on the right is not zero. Because the amplitude of the mud impedance may be dependent on standoff, the Z90 quantity may also be dependent on standoff. Thus, the measured phase of the button impedance may need to be the same or close to the real phase of the button impedance.

Z90 may be dependent on incorrect mud angle and incorrect measurement phase angle. By combining the impedance and phase angle equations above and the effect of both, an error or offset in the mud angle and an error or offset in the measured button impedance phase may be derived. Assuming the following:

$$Z90=\text{abs}(Z\_button)*\sin[\text{angle\_measured}(Z \text{ button})-\text{angle\_estimated}(Z\_mud)] \text{ [Ohm]} \quad \text{Equation (20)}$$

it follows that:

$$Z90=\text{abs}(Z\_mud)*\sin\{\Delta\text{angle}(Z\_button)-\Delta\text{angle}(Z\_mud)\}+\text{abs}(Z\_form)*\sin\{\text{angle}(Z\_form)-\text{angle}(Z\_mud)+\Delta\text{angle}(Z\_button)-\Delta\text{angle}(Z\_mud)\} \text{ [Ohm]} \quad \text{Equation (21)}$$

If $\Delta$angle(Z_button)$-\Delta$angle(Z_mud)=0 (i.e., if the error or offset in the measured phase is equal to the error or offset in the estimated mud angle such that the difference is zero), then Z90 may be independent of the amplitude of the mud impedance and, therefore, in first order approximation, independent of standoff.

Z90 may also be used to determine various formation parameters. The formation properties may be derived from the Z_button measurements. The button impedance (Z_button) may be used as a first order approximation equal to the sum of the impedance of the path through the mud between the button electrodes and the formation, and the impedance of a path through the formation itself. In other words, the button impedance may be the total impedance of the mud impedance and the formation impedance in series where the impedances are complex phasors as described above and as set forth below:

$$Z\_button=Z\_mud+Z\_formation \text{ [Ohm]} \quad \text{Equation (22)}$$

The mud impedance between the button electrode and the formation may dominate the mud impedance between the return electrode and the formation. Depending on model accuracy, the latter impedance may be neglected. The formation properties may then be obtained from Z_button. Z_mud may be estimated and subtracted from Z_button as follows:

$$Z\_formation=Z\_button-Z\_mud. \text{ [Ohm]} \quad \text{Equation (23)}$$

Z_formation gives the complex formation impedance which can be converted with a k-factor (geometric factor) into a resistivity and a permittivity of the formation.

The complex mud impedance (Z_mud) may be difficult to estimate since it varies with the thickness of the mud layer between the button electrode and the formation (standoff). To address this, the phase angle of the mud impedance may be used as follows:

$$Z90=\text{abs}(Z\_button)*\sin[\text{angle}(Z\_button)-\text{angle}(Z\_mud)] \text{ [Ohm]} \quad \text{Equation (24)}$$

$$=\text{imag}(\text{abs}(Z\_button)*\exp\{i*[\text{angle}(Z\_button)-\text{angle}(Z\_mud)]\}) \text{ [Ohm]} \quad \text{Equation (25)}$$

$$=\text{imag}(\text{abs}(Z\_button)*\exp\{i*\text{angle}(Z\_button)\}*\exp\{-i*\text{angle}(Z\_mud)\}) \text{ [Ohm]} \quad \text{Equation (26)}$$

$$=\text{imag}([\text{abs}(Z\_mud)*\exp\{i*\text{angle}(Z\_mud)\}+\text{abs}(Z\_form)*\exp\{i*\text{angle}(Z\_form)\}]*\exp\{-i*\text{angle}(Z\_mud)\}) \text{ [Ohm]} \quad \text{Equation (27)}$$

$$=\text{imag}([\text{abs}(Zform\_mud)+\text{abs}(Z\_form)*\exp\{i*\text{angle}(Z\_form)-\text{angle}(Z\_mud)\}) \text{ [Ohm]} \quad \text{Equation (28)}$$

$$=\text{abs}(Z\_form)*\sin\{\text{angle}(Z\_form)-\text{angle}(Z\_mud)\}$$
[Ohm]  Equation (29)

This shows that, with the help of an estimated mud impedance phase angle angle(Z_mud), a quantity Z90 can be determined from the measurement. Z90 may be approximately proportional to the magnitude of the formation impedance Z_formation when there is a difference between the phase angle of the mud impedance and the phase angle of the formation impedance.

Z90 may be independent of the amplitude of the mud impedance abs(Z_mud) and, therefore, independent of the thickness of the mud layer between the button electrode and the formation (standoff). The formation resistivity may be over a large range of resistivity values monotonically related to the magnitude of the formation impedance and, therefore, to the Z90 quantity. Z90 can, thus, be used as a measure of formation resistivity. Based on the above, from the measured button impedance (Z button) and an estimation of the mud angle (angle(Z_mud)), a quantity Z90 which may be a metric/measure of formation resistivity can be determined. This metric/measure may be independent of standoff.

In some cases, it may be useful to adjust Z90 for various errors that may occur under various conditions, such as mud angle, formation resistivity, standoff, amplitude of mud impedance, phase angle, and phase button variation. By determining various known and measured parameters, Z90 may be adjusted. For example, an incorrect mud angle (or mud impedance angle) can affect Z90. If the mud angle is incorrectly estimated, then the Z90 quantity may become sensitive to the standoff. Where Δangle(Z_mud) is the estimated mud impedance angle minus the real mud impedance angle, it follows that:

$$\Delta\text{angle}(Z\_mud)=\text{angle\_estimated}(Z\_mud)-\text{angle}(Z\_mud)\ [\text{rad}]$$
Equation (30)

Performing a similar calculation as above, Z90 can be expressed as follows:

$$Z90=\text{abs}(Z\_button)*\sin[\text{angle}(Z\_button)-\text{angle\_estimated}(Z\_mud)]\ [\text{Ohm}]$$
Equation (31)

$$Z90=\text{abs}(Z\_mud)*\sin\{-\Delta\text{angle}(Z\_mud)\}+\text{abs}(Z\_form)*\sin\{\text{angle}(Z\_form)-\text{angle}(Z\_mud)-\Delta\text{angle}(Z\_mud)\}\ [\text{Ohm}]$$
Equation (32)

Based on the above equations, given some difference between the estimated mud angle and the real mud angle, the Z90 quantity may become sensitive to the amplitude of the mud impedance abs(Z_mud) since the first term on the right is not zero. Because the amplitude of the mud impedance may be dependent on standoff, the Z90 quantity may also be dependent on standoff. Thus, an estimation of the mud angle (angle(Z_mud)) may be useful.

Measurement phase angle may affect Z90. If either or both of the phase of the return voltage measurement and the phase of the button current measurement have an error or offset, then the phase angle of the button impedance (angle(Z button)) may have an error (assuming the two errors do not cancel). The effect on the measure Z90 may be the same whether the offset or error is in one of the other or both (except for the sign). Assuming the following:

$$\Delta\text{angle}(Z\_button)=\text{angle\_measured}(Z\_button)-\text{angle}(Z\_button)\ [\text{rad}]$$
Equation (33)

it follows that:

$$Z\_button\_measured=\text{abs}(Z\_button)*\exp\{i*\text{angle\_measured}(Z\_button)\}\ [\text{Ohm}]$$
Equation (34)

$$=\text{abs}(Z\_button)*\exp\{i*\text{angle}(Z\_button)\}*\exp\{i*\Delta\text{angle}(Z\_button)\}\ [\text{Ohm}]$$
Equation (35)

$$=Z\_button*\exp\{i*\Delta\text{angle}(Z\_button)\}\ [\text{Ohm}]$$
Equation (36)

$$=(Z\_mud+Z\_formation)*\exp\{i*\Delta\text{angle}(Z\_button)\}\ [\text{Ohm}]$$
Equation (37)

and performing a similar calculation as above with the following:

$$Z90=\text{abs}(Z\_button)*\sin[\text{angle\_measured}(Z\_button)-\text{angle}(Z\_mud)]\ [\text{Ohm}]$$
Equation (38)

it follows that:

$$Z90=\text{abs}(Z\_mud)*\sin\{\Delta\text{angle}(Z\_button)\}+\text{abs}(Z\_form)*\sin\{\text{angle}(Z\_form)+\Delta\text{angle}(Z\_button)-\text{angle}(Z\_mud)\}\ [\text{Ohm}]$$
Equation (39)

This shows that, given some difference between the measured phase of the button impedance and the real phase of the button impedance, the Z90 quantity may become sensitive to the amplitude of the mud impedance abs(Z_mud) since the first term on the right is not zero. Because the amplitude of the mud impedance may be dependent on standoff, the Z90 quantity may also be dependent on standoff. Thus, it may be useful for the measured phase of the button impedance to be the same or close to the real phase of the button impedance.

The mud angle and phase angle may also affect Z90. The mud angle and measured phase angle can be combined to derive the effects of error or offset in the mud angle and error or offset in the measured button impedance phase. Assuming the following:

$$Z90=\text{abs}(Z\_button)*\sin[\text{angle\_measured}(Z\_button)-\text{angle\_estimated}(Z\_mud)]\ [\text{Ohm}]$$
Equation (40)

it follows that:

$$Z90=\text{abs}(Z\_mud)*\sin\{\Delta\text{angle}(Z\_button)-\Delta\text{angle}(Z\_mud)\}+\text{abs}(Z\_form)*\sin\{\text{angle}(Z\_form)-\text{angle}(Z\_mud)+\Delta\text{angle}(Z\_button)-\Delta\text{angle}(Z\_mud)\}\ [\text{Ohm}]$$
Equation (41)

If Δangle(Z_button)−Δangle(Z_mud)=0, or if the error or offset in the measured phase is equal to the error or offset in the estimated mud angle such that the difference is zero, then Z90 may be independent of the amplitude of the mud impedance and, therefore, provide a first order approximation independent of standoff.

Cased Hole Analysis

The cased hole measurements, such as those taken using the downhole tool 114 in the cased portion 124 of the wellbore 105 of FIG. 1-1, may be used to provide reference measurements in calibrations or as inputs for further analysis. In using the cased hole measurements, one or more of the following can be assumed: 1) the casing 106 is a near perfect conductor or insulator, 2) the cased hole measurements have a comparable magnitude of measurement current in a low-resistivity formation, 3) the cased portion 124 has similar environmental conditions as the adjacent open hole portion 126, 4) the casing 106 has a known diameter Φ and curvature radius $\varphi_c$ (FIG. 2-1), and 5) the casing 106 has a smooth surface with negligible rugosity.

The phase angle of the measurement (e.g. return voltage divided by button electrode current) may be defined by the phase angle of the mud and the phase offset of the measurement system. A basic two impedance model of the current-injection measurement may be used. A voltage is applied across two complex impedances in series, one representing the mud the other representing the formation (or the casing if the tool is located in the casing). The current is measured and the voltage divided by this measured current to generate the total impedance of the two impedances in series. If the formation/casing impedance is nearly zero (due to the high casing conductivity), then the current may be defined by the mud impedance. Thus, the total impedance may be assumed to be equal to the mud impedance. The magnitude of the mud impedance may vary with the standoff (thickness of the mud layer between the casing and the electrodes). Thus, the mud impedance phase angle may not vary with the standoff as it is assumed to be geometry invariant.

Various techniques may be performed, such as comparisons, to evaluate measurements and address various issues affecting the measurement. For example, the cased measurements may be used to ensure that the reference casing measurement has roughly the same measurement current magnitude as the open-hole formation measurement. Electronic measurement systems may behave differently for different signal magnitudes. When measuring a weaker signal, the effect of internal crosstalk may be different than when measuring a stronger signal. In another example, a weaker measurement may be performed at different electronic gain settings with different gain and phase offsets. The signal strengths may be similar between a measurement taken in the casing as a reference measurement and a measurement of a low resistivity formation. Therefore, application of a casing reference measurement to correct the formation measurement may be less prone to errors than corrections based on reference measurements that have a different signal strength than the strength of the signal to be corrected.

Mud properties can also be measured by measuring with the sensor pads retracted from the formation (i.e. with a reference pad closed measurement). However, this measurement may involve weaker signals than when the sensor pads are pressed against a borehole wall with a relative low formation resistivity. In another example, the cased measurements may also address variations in temperature and pressure of borehole fluids. Drilling mud can be measured at surface and tools can be calibrated at surface as well. To obtain the desired mud correction, however, these surface measurements may be extrapolated to downhole pressure and temperature conditions, or measured at surface under similar pressure and temperature conditions as downhole.

In yet another example, the cased measurements may also be used to address curvature of the sensor pad relative to the casing (or pad curvature radius $\varphi_p$) as shown in, for example, in FIG. 2-2. If an array of electrodes is placed on a sensor pad with a known curvature and if this pad is pressed against the casing, then the signal amplitudes the other electrodes can be determined based on measurements of a few electrodes, (e.g., 2 or 3 electrodes).

The obtained casing measurements may be used to generate various reference measurements (or cased hole parameters), such as raw phase, phase button variation, phase calibration, mud angle, amplitude button variation, amplitude calibration, and mud permittivity. The casing measurements may be, for example, resistivity measurements taken in casing to generate one or more image measurements and one or more return voltages using one or more return electrodes in a sensor pad as described above.

Raw phase may involve a determination of a raw phase offset (including mud angle effect and electronics phase offset) to be used with orthogonal processing. The phase of measured impedance is the raw phase offset in the Z90 processing including both the mud angle and the sensor phase correction.

Phase button variation may involve a reduction in phase variation between multiple button electrodes (see, e.g., FIG. 2-2). In this case, voltage and current may be used to determine a phase of measured button impedances. Because the casing is assumed to be a near perfect conductor, the buttons may read the same phase (in principle equal to the phase of the mud impedance). Variations in readings in the phase of the measured button impedances may be calibrated (or corrected) with respect to each other.

Phase calibration may involve calibration of a sensor using a known mud angle. One or more return and one or more button electrodes may be used to generate a voltage and current. This information may be used to generate a phase offset of the measured impedance. This offset may be used to correct the sensor or measurements taken by the sensor to provide a more accurate measurement.

The mud angle may be known, or determined from other measurements. Because the casing may be assumed to be a near perfect conductor, the mud impedance may determine the phase of the measured impedance. The phase of measured impedance may be equal to the mud angle. Thus, the phase of the measured impedance may be calibrated (or corrected) using the mud angle.

A determination of mud angle may be performed. One or more button and return electrodes may be used to generate voltage and current. This information may be used to generate a phase of measured impedance. Because casing may be assumed to be a near perfect conductor, the mud impedance may determine the phase of the measured impedance and, therefore, the mud angle may be equal to the phase of measured impedance. Thus, the mud angle can be converted into an equivalent loss tangent tan(delta_mud).

Amplitude button variation involves reducing amplitude variations between buttons using a fitting curve or a button standoff (e.g., $d_{b1-13}$ of FIG. 2-1). One or more return electrodes may be used with multiple button electrodes to generate multiple button currents. The voltage and button currents may be used to generate measured button impedances. These may be fitted to a smooth curve (e.g., quadratic) through the impedances. Mismatch between the curve and button impedances may be determined for each button electrode. The mismatches may be used to correct button impedances and to reduce button to button impedance variations.

Amplitude calibration involves calibration of sensors using mud permittivity and wear plate standoff $d_b$ (FIG. 2-1). One or more return electrode, one return voltage, one image button, and one button current may be used to generate voltage and current. A measured impedance may be generated from the voltage and current.

Mud permittivity may be known, or generated from other measurements. The mud permittivity may be processed with estimated standoff, button size, signal spectrum (frequency), and impedances calculated. The calculated impedance may be used to correct or calibrate the measured impedance calculated from the voltage and current. Mud permittivity may be estimated using button impedance and wear plate protrusion. For example, one or more return electrodes, one return voltage, one image button, and one current button may be used to generate voltage and current. Measured impedance may be generated from the voltage and current. The impedance may be processed with estimated standoff, button size, parallel plate capacitor model, signal spectrum (frequency), and epsilon mud (εmud) may be generated.

The cased hole measurements may also be used in combination with curvature mismatch concepts, such as raw phase curvature, mud permittivity and button standoff, and amplitude calibration curvature (discussed further below). Raw phase curvature involves a determination of a raw phase offset (including mud angle effect and electronics phase offset) to be used with orthogonal processing. One or more return electrodes may be used to generate one return voltage. A difference between a casing curvature radius $\varphi_c$ and a pad curvature radius $\varphi_p$ may be known. Two image buttons may be chosen such that these have different standoffs due to curvature difference. A voltage and current may be generated from the button electrodes, and a phase of measured impedance generated. Z90 may be determined from processed data, and a casing resistivity generated. Raw phase offset of measured data may be optimized until Z90 processing gives a casing resistivity equal to about 0.00 Ohms and/or negligible variation between button electrodes with different standoff. The sum of the mud angle and the sensor phase correction may be used as an optimal phase offset.

Mud permittivity and button standoff may be performed using curvature mismatch between pad and casing (difference between a casing curvature radius $\varphi_c$ and a pad curvature radius $\varphi_p$). One or more return electrodes may be used to generate a return voltage. A casing radius, pad curvature radius and pad geometry with button layout may be known or measured. For example, three or more image buttons may be chosen such that these have different standoff due to curvature difference, and three button current measurements may be generated. The standoff difference may be calculated based on geometry (positions of buttons, curvatures, estimated positioning of the pad against casing (which button is closest to the casing)). Voltage and currents may be determined, and measured impedance generated. The information may be processed (measured impedance difference, standoff difference, button sizes, signal spectrum (frequency)), and epsilon mud and standoff of individual buttons may be determined.

Amplitude calibration of sensors using differential standoff instead of estimated standoff may be performed. This may involve a combination of mud permittivity standoff curvature and amplitude calibration as described above.

The cased measurements may be used to estimate the mud angle and the measurement phase offset, for example, in a single step. As shown in FIG. 2-1 through 2-2, the sensor pad 117 may be positioned against the casing with standoff elements (e.g. wear plates 130, 131 or hard insulation protruding elements on the pad) preventing the button and return electrodes 140, 136 from touching the metal casing 106. Therefore, a layer of mud 111 may remain between the button electrode 140 and the metal casing 106, the latter of which may have a resistivity at least two orders of magnitude lower than the formation. In one example, raw phase offset may be used to estimate mud angle in the casing. The raw phase offset (RawPhs) (including mud angle effect and electronics phase offset) may be determined for use with orthogonal processing.

A measurement of the phase of the return voltage and of the phase of the button current in the casing may be performed. The phase of the button impedance, angle_measured(Z_button) in the casing, may be determined by taking the difference of the two phase values. Using equation (22), Z_formation in this case represents the impedance of the current path through the casing and Z_mud represents the impedance of the current through the mud. Because the casing is assumed to be a good conductor, Z_formation is assumed to be very close to zero and it can be neglected such that in the casing may be represented as follows:

$$Z\_button\_casing \approx Z\_mud\ casing\ [Ohm] \qquad \text{Equation (42)}$$

which gives:

$$angle(Z\_button\_casing) \approx angle(Z\_mud\_casing)\ [rad] \qquad \text{Equation (43)}$$

and, thus:

$$angle\_measured(Z\_button\_casing) \approx angle(Z\_mud\_casing) + \Delta angle(Z\_button)\ [rad] \qquad \text{Equation (44)}$$

Using Equation (10) above and selecting angle_measured (Z_button_casing) as the estimated mud angle, the following is generated:

$$angle\_estimated(Z\_mud) = angle\_measured(Z\_button\_casing)[rad] \qquad \text{Equation (45)}$$

which may be rewritten as:

$$\Delta angle(Z\_button) \approx \Delta angle(Z\_mud)\ [rad] \qquad \text{Equation (46)}$$

Such that, in the following formula:

$$Z90 = abs(Z\_mud)*sin\{\Delta angle(Z\_button) - \Delta angle(Z\_mud)\} + abs(Z\_form)*sin\{angle(Z\_form) - angle(Z\_mud) + \Delta angle(Z\_button) - \Delta angle(Z\_mud)\}\ [Ohm] \qquad \text{Equation (47)}$$

the first term becomes negligible and, therefore, Z90 may become standoff independent. In other words, if the button impedance measurement has a phase offset, then the button impedance measurement in the casing may also have the same phase offset because it is measured with the same system. Then, if the casing measurement is used as a measurement of the mud angle, then the mud angle may have about the same phase offset as the standard openhole measurement. In the Z90 formula, the mud angle can be subtracted from the open hole button impedance angle and, therefore, if both contain the same offset (or error), the offset disappears as set forth below:

$$(A+\text{offset})-(B+\text{offset})=A-B\ [rad] \qquad \text{Equation (48)}$$

Based on the above methodology, the cased hole analysis may be used to verify sensor measurements and determine various cased hole parameters (e.g., mud, tool or other parameters measured in the cased hole parameters). The downhole tool 114 may have several imaging buttons where neighboring button electrode measurements correspond to neighboring pixels in the borehole image. An image processing technique known as equalization can be done after the data has been converted to a resistivity image. This technique may be used, for example, in configurations where the image buttons measurements have varied average values over a chosen equalization window length, or where the image buttons give the same response in front of the same formation. If the image buttons respond differently, the final image may have darker and lighter vertical lines that may hide relevant information in the image.

Casing measurements may be used to help align the image buttons to respond in the same way under the same conditions where the electronics and sensor phase offsets cancel using the phase button variation as discussed above. Thus, for each image button the offsets may cancel and the image buttons may read the same Z90 value in front of the same formation.

In addition, the casing measurement may give an indication of relative phase offsets of the different image buttons. The measurements of the individual image buttons in the casing each can be identified with the angle of the mud impedance as described above. The fact that the mud is the same in front of different buttons may suggest that the phase of each button measured should read the same where no phase offsets are present in the button measurements (due to sensor or electronics offsets), or if the phase offsets of the image buttons were the same. If the image buttons have different phase offsets, then an average and estimate of which buttons have a small or large offset with respect to the average can be determined. In some cases, individual image buttons may have such large offsets that some measurements may be replaced with data from a neighboring button(s), either by, for example, averaging the data of the buttons on either side.

By performing casing measurements in subsequent well-logging runs or jobs, the relative button phase offsets may be evaluated to track whether the tool degrades and/or varies over time and under different known conditions. In other words, phase offsets may act as an indicator that can be used for quality control.

In some Z90 applications, the measured phase values may be corrected such that they read the same in the casing as is expected. By determining the difference between each button phase and average phase, the button offset may be determined. The button phase values may be corrected by subtracting each button offset from the corresponding button phase.

Open Hole Analysis

Open hole analysis may be performed using many of the same techniques as the cased analysis. The downhole tool 114 may be positioned in the open hole portion 126 of the wellbore as shown in FIG. 1-1 for performing open hole measurements. The open hole measurements may be performed using mud measurements with the same electronics and the same sensors as the cased hole measurements such that the phase offsets due to electronics and sensors both cancel. Measurements and analysis based on cased hole and open hole applications (as well as known parameters) may be evaluated.

The casing measurement (AngMudpOff), an open hole amplitude measurement (AbsZpOff), and an open hole phase measurements (AngZpOff) may be used to determine Z90 using the following equation:

$$Z90 = \text{AbsZpOff} * \sin[\text{AngZpOff} - \text{AngMudpOff}] \text{ [Ohm]} \quad \text{Equation (49)}$$

The resulting Z90 may be a metric or measure of formation resistivity nearly independent of standoff. An image may be generated from the resulting Z90.

Separation of Measurement Offsets and Mud Effects

In some cases the mud angle may be known, or measured with another tool, such as a dielectric scanner or other downhole tool. It may also be possible to measure at surface and the value downhole derived. In such cases, the measurement may be done in the casing with the imaging tool. The measured button impedance phase may read the mud angle. If not, the phase measurement can be calibrated (or corrected) by applying a difference between an expected measurement and an actual measurement to each button phase.

In some cases, the calibration of the tool may be such that the offsets due to electronics and sensor offsets may be small or sufficiently accurately known in comparison with the accuracy with which the mud angle is determined. For example, if the offsets are smaller than about 1 degree and a button impedance angle of about −80 degrees is measured, the mud impedance angle may lie between about −79 and about −81 degrees. Thus, the mud angle can be determined assuming that the known offsets are sufficiently accurate.

The mud angle may be used as an indication of the quality or stability of the mud. Where the mud angle value is above −90, then the more likely the mud angle may vary over different parts of the open-hole log, the more likely the mud will be inhomogeneous, and the more likely the angle between the formation impedance angle and the mud angle will be small. Thus, a degraded oil-based mud imaging performance for mud angles far above −90 deg can be expected.

Amplitude

In some cases, the casing measurement may not be sufficient as a reference for button impedance phase measurement, or as a reference for button impedance amplitude measurement. In a first order approximation, the button impedance in the casing may be equal to the mud impedance assuming the casing is a good conductor such that the 'formation' impedance is negligibly small. The mud impedance may then be approximated as the impedance of a (leaky) parallel plate capacitor. The complex capacitance formula for such a capacitor is:

$$C = A * (\text{eps\_r} * \text{eps0} + (\text{sigma}/(i*\text{omega})))/s \text{ [F]} \quad \text{Equation (50)}$$

where C is the capacitance, A is the button area, eps_r is the relative mud permittivity, eps0 is the permittivity of free space, i is the square root of −1, omega=2 * pi * operating frequency, sigma=the mud conductivity, and s=the mud thickness between the button and the casing (standoff). The complex mud impedance then follows as:

$$Z\_\text{mud} = (i*\text{omega}*C)^{-1} = s/(i*\text{omega}*A*\text{eps\_r}*\text{eps0} + A*\text{sigma}) \text{ [Ohm]} \quad \text{Equation (51)}$$

The button area (A) or any other parameter may be slightly adjusted compared to reality to include fringing capacitance or other geometric effects, such as the casing and the button not being parallel or either being curved.

A measurement in the casing with a known-geometry tool provides a measured impedance amplitude: abs_measured (Z_button_casing). This impedance measurement can be used to solve for one out of three main unknowns defining the measured button impedance amplitude: gain factor (p), button standoff(s) and the relative mud permittivity (eps_r). The one unknown can be solved if information about two other unknowns can be determined. The mud conductivity may to first order be neglected.

The measured amplitude may have an offset with respect to the real impedance amplitude. A gain factor p may be defined as follows:

$$\text{abs\_measured}(Z\_\text{button\_casing}) = p*\text{abs}(Z\_\text{button\_casing}) \text{ [Ohm]} \quad \text{Equation (52)}$$

The factor p may change over time, with temperature, pressure, etc. The factor p can originate from gain offsets in the measured current and/or voltage. The three unknowns enter in the equation in a linear manner as follows:

$$\text{abs\_measured}(Z\_\text{button\_casing}) = \text{cnst}*p*s/\text{eps r\_r} \text{ [Ohm]} \quad \text{Equation (53)}$$

where cnst is some known constant. Depending on other information provided, there are several optional approaches: 1) determining p, given information about s and eps_r or information about s/eps_r, 2) determining s, given information about p and eps_r or information about p/eps_r, 3) determining eps_r, given information about p and s or information about p * s, 4) determining p * s, given information about eps_r, 5) determining s/eps_r, given information about p, 6) determining p/eps_r , given information about s, and/or 7) verifying whether information about p, s and eps_r is coherent.

Information may be based on the order of magnitude, an interval of confidence, a value with some standard deviation, or some other basis. An example of information about p involves a calibration measurement of the tool at the surface.

A calibration technique may involve placing the sensor pad at a given small distance (e.g., about 4 mm) from a metal sheet (which may be curved to follow the shape of the pad). A (known) gas or fluid or solid material may be placed between the pad and the sheet. The standoff and the medium between the button and the metal sheet may be accurately known or measured. Then a tool measurement may be taken. From this measurement and knowledge of the standoff and medium, factor p, which refers to a gain correction parameter, may be determined. This p can be used later in the downhole measurement as input information.

As shown in FIG. 2-2, button standoffs $d_{bi-13}$ and the protrusion of the wear plates 130, 131 (or standoff $d_b$) of the pad 117 is known. The button-to-casing distance (or standoff) may be assumed to be close to the wear plate protrusion (or standoff). For example, eps_r (Equations 50-53) is a value obtained with another measurement, such as a dielectric scanner or a separate mud sensor. An example of information about p/eps_r is a value obtained by measurement with the sensor pads a distance from the casing or borehole wall. If both p and s are known, for example from the above examples, then the mud permittivity downhole can be determined. If both eps_r and s are known, for example from the above two examples, then the system amplitude offset (p) downhole can be determined.

Impedance Phase Offset

When an array of button electrodes is disposed at a distance (e.g., approximately 0.01 to 15 mm) from a conductive surface, the measure current from the buttons couples capacitively to the conductive surface. The current may propagate with relatively low resistance towards the return electrodes. The current will pass capacitively from the conductive surface to the return electrodes, such that the current path is comparable to two capacitors in series. The theoretic impedance of the current path may then be determined as follows:

$$Z=1/(i*\Omega*C_{button\_conductiveSurface})+1/(i*\Omega*C_{return\_conductiveSurface}) \text{ [Ohm]} \quad \text{Equation (54)}$$

The impedance amplitude measured by the tool may be calibrated to match the theoretic impedance amplitude calculated using the relationship above. In addition, the impedance phase measured by the tool can be calibrated to the theoretic impedance phase which is the impedance phase of the current path (e.g., the conceptual two capacitors in series) with a −90 degree phase shift.

A one- or two-capacitor model may be an approximation of the real electromagnetic configuration. Theoretical impedance amplitude and phase may also be obtained by modeling the electromagnetic configuration, such as by using a finite element method.

Multiple Buttons

In the case of a tool with an array of button electrodes, an impedance measurement can be generated for each button electrode. The button electrode may be indexed through j for n measurements as follows:

$$\text{abs\_measured}(Z\_button\_casing)\_j = \text{cnst}\_j * p\_j * s\_j / \text{eps}\_r \text{ [Ohm]} \quad \text{Equation (55)}$$

where eps_r is not a function of j because the mud permittivity may be the same in front of the buttons in the casing, cnst_j is known for each button, and the default value for p_j is one.

Although a curvature difference between the button array and the casing may lead to a different standoff s for each button electrode, the standoff s may not be random. The button electrodes may follow a part of a circle with a curvature radius r1. This part of the circle will be in some way defined by a mandrel position, articulation, wear plates, etc., inside the circular casing with inside curvature radius r2 (which is also known) (see, e.g., $\varphi_c$ of FIG. 2-1).

The standoffs of the array of button electrodes starting on one edge of the sensor pad 117 towards the other edge of the sensor pad may be a smooth curve. For example, if the pad curvature radius ($p_c$ is smaller than the casing radius $\varphi_c$, then the button electrodes at the edge will have the most standoff (e.g., $d_{b7}$, $d_{b13}$). The standoff reduces smoothly to the minimum value as the buttons are followed towards the middle of the sensor pad (e.g., $d_{b1}$) and assuming a centered mandrel and standard sensor pad articulation. Thus, a smooth curve of standoffs may be assumed as a function of button electrode positions.

The gain factors p_j may not follow a smooth curve. They may have random offsets. These random offsets can be corrected by plotting the function abs_measured(Z_button_casing)_j as a function of j, and then changing the values p_j until abs measured(Z_button_casing)_j becomes a smooth function of j. For example, abs measured(Z_button_casing)_j may be plotted as a function of j for the default values of P0 p_j and fit a quadratic curve through the points. The distances between the individual points and the curve can then be translated into the following values for p_j:

$$p\_j = \text{abs\_measured}(Z\_button\_casing)\_j / \text{quadratic}\_j \text{ [Ohm]} \quad \text{Equation (56)}$$

where quadratic_j means the value of the quadratic fitting function at position of button j.

Button electrodes having a value for p_j that is different from the rest of the button electrodes can also be detected. This may be an indication of a weak or broken button which may affect images, for example resulting in a striping effect in the final image after processing. The data may be replaced or enhanced as previously explained.

Multiple Standoffs

Two or more standoff measurements may be made, and differences in impedance based on differences in standoff may be determined by performing impedance amplitude and phase measurements at multiple standoffs, resulting in calibration data for a range of impedances. In one embodiment, a surface of a pad may be flattened, and spacers having different thicknesses may be disposed on the pad surface, such that measurements may be obtained at different standoffs. In another embodiment, the surface of the pad may be mechanically positioned at multiple standoffs without spacers.

By obtaining calibration measurements at multiple standoffs, electronic components in the pad may be calibrated for different amplifier settings or operation points. Determining the difference between two or more standoffs may also be easier to accurately calculate than determining an absolute standoff, and the impedance differences between two or more standoffs may be used to calibrate the pad. Furthermore, non-linearity of electronics and crosstalk may be detected and addressed using multiple standoff calibration measurements.

Temperature Calibration

Some embodiments involve calibrating the tool based on temperature variation to reduce changes in electronic offsets which may vary with changes in temperature. In one embodiment, a pad may be positioned and separated by an air gap from a conductive surface. The conductive surface may include conductive material which does not deform over temperature changes compared to insulating materials. The air gap between the pad and the conductive surface may introduce little change of electrical parameters over temperature changes, which may result in stable calibration, as variations observed in the pad measurement may be substantially attributed to the pad measurement system, which may be used for temperature calibration.

Curvature Mismatch

If there is a known curvature mismatch between the pad curvature $\varphi_c$ and the curvature of the inside of the casing $\Phi_c$ (see, e.g., FIG. 2-1) then, in the case of multiple buttons, the eps_r of the mud on one hand and a value for standoff for each button electrode on the other hand can be separated. Thus, mud permittivity can be distinguished from standoff. The standoff difference that various buttons may have in order to respect geometrical constrains of pad and casing curvature can be estimated.

In an example implementation, the sensor pad 117 may be pressed against casing 106 as shown in FIG. 2-2. Some additional standoff keepers prevent the button electrodes from touching (e.g., protruding wear plates). For example, six button electrodes with button current spaced at roughly 10 mm may be provided. The button impedance (Zibut) may be determined as some voltage divided by the button current for each button electrode. A curve may be fitted through the button impedance values. This curve may have a minimum at the button position where the button electrode is closest to the casing. In other words, the position of the minimum of the fitting curve determines where the sensor pad is closest to the casing. This information together with the geometry of the sensor pad and the curvature of the casing, may provide an estimate of the relative casing standoff of each button.

Figure 3:
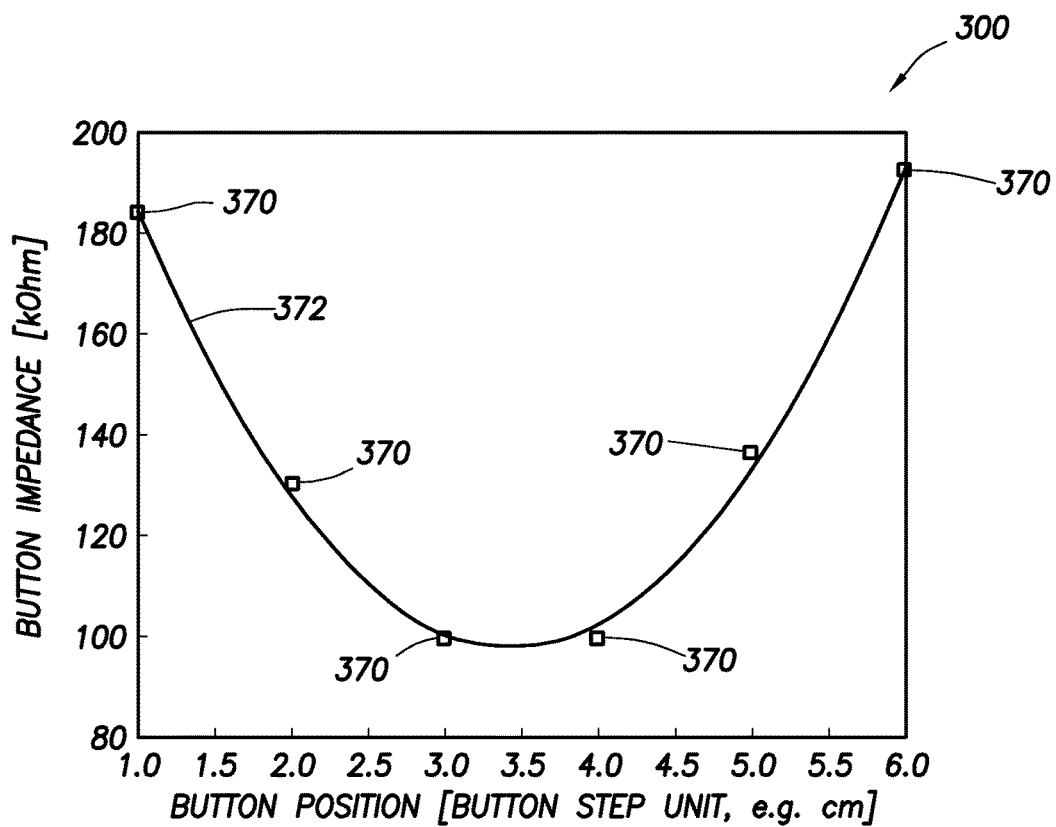
FIG. 3 is a graph depicting curve fitting of impedance of a plurality of button electrodes.
Figure 2:
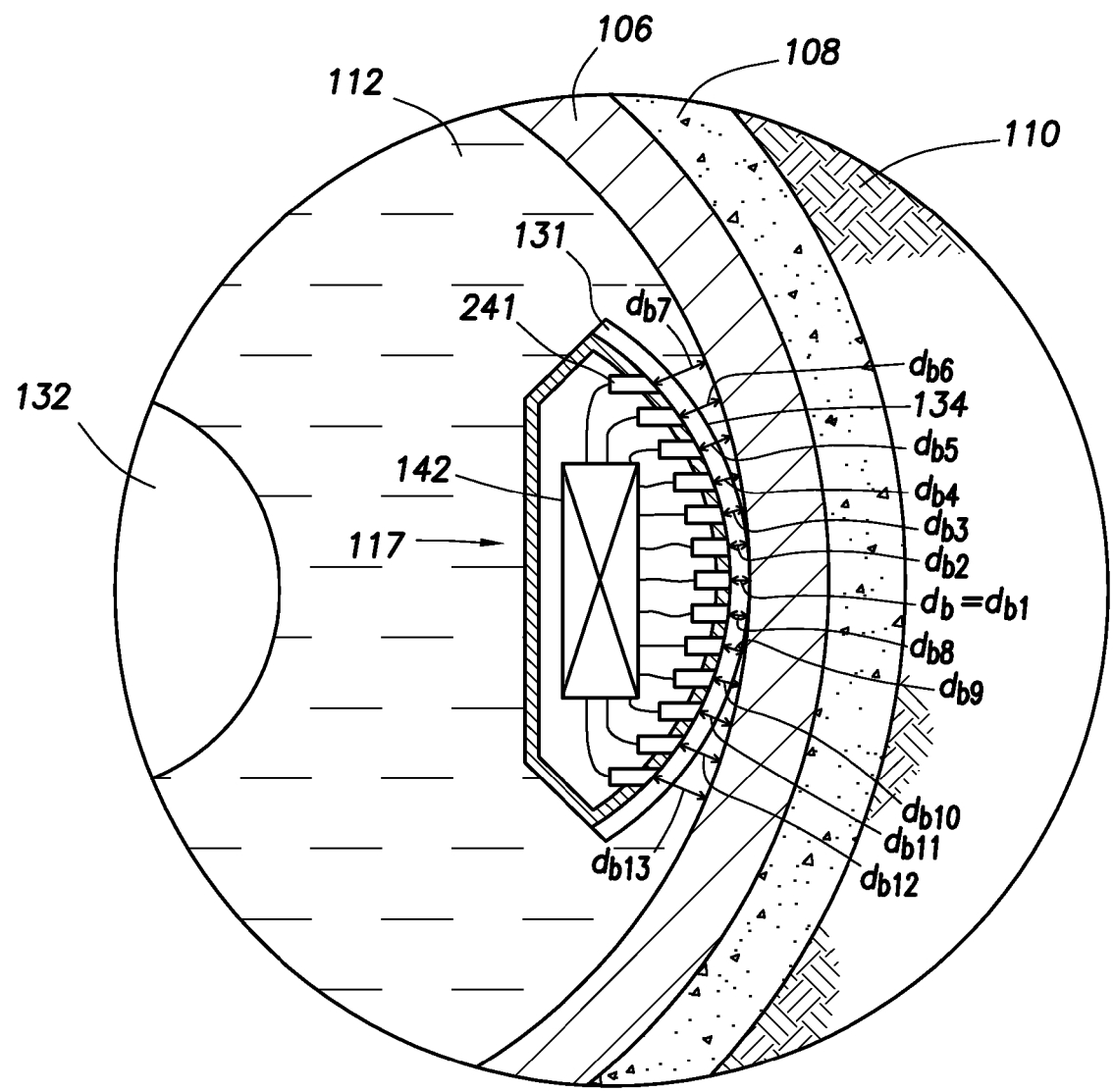

For a minimum distance (or standoff) (x-axis) between the sensor pad and the casing indicated by the variable somin (i.e. the standoff at position 3.4 of FIG. 3 shown below) and assuming known pad curvature, known button electrode positions on the pad and known casing curvature, the button standoff for each button can be determined. For a function (fibut) giving the standoff for each button electrode in a casing with diameter (casingdiam), for a sensor pad with a curvature radius (crvrad), and for a given value somin at a minimum standoff position (xsomin), the standoff for each button (soibut) is given by:

$$\text{soibut (somin)} = \text{fibut(casingdiam, crvrad, somin, xsomin) [m]} \quad \text{Equation (57)}$$

FIG. 3 is a graph 300 depicting button impedances (Y-axes) versus button electrode position (x-axis). The button impedances 370 are depicted with a quadratic polynomial fit line 372 therethrough. The quadratic fit shows a minimum at button electrode position 3.4, i.e. the azimuth position closest to the formation, measured in button step units, is located at position xsomin=3.4 units. Based on FIG. 3, the following may be approximated:

$$\text{soibut (somin)} \approx \text{fibut(casingdiam, crvrad, 0, xsomin)} + \text{somin [m]} \quad \text{Equation (58)}$$

Figure 4:
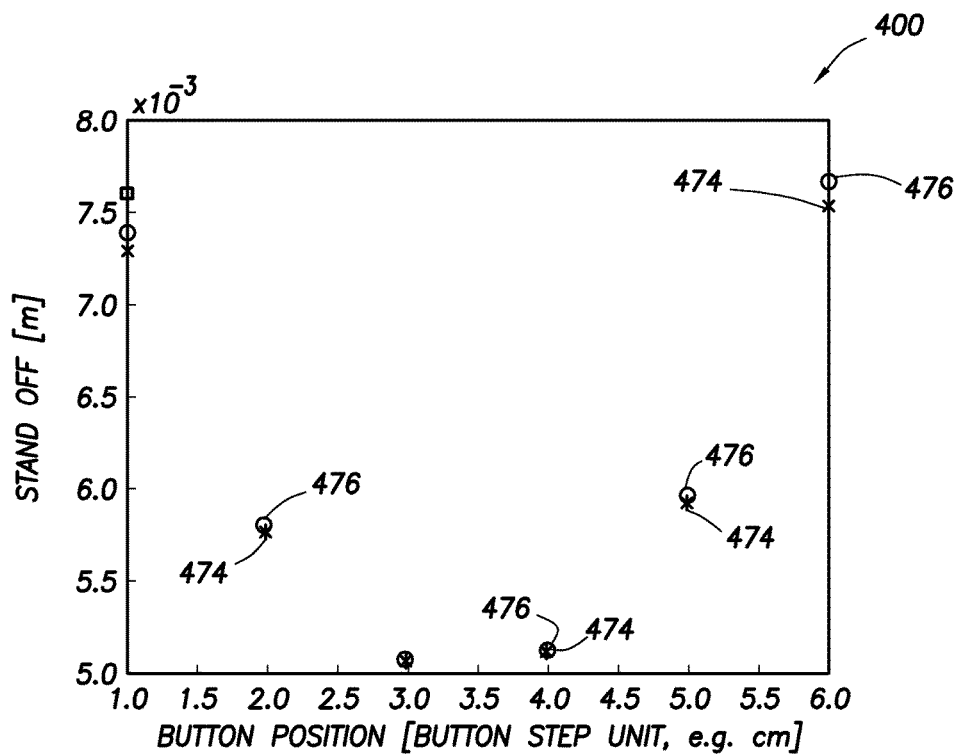
FIG. 4 is a graph depicting standoff of a plurality of button electrodes.

In this case there is maximum a few percent error at the edge button electrodes given that somin less than or equal to about 5 mm. FIG. 4 is a graph 400 depicting a small difference between soibut (somin) 474 and the approximationfibut(casingdiam, crvrad, 0, xsomin)+somin 476, for somin=5 mm. In this graph 400, standoff (y-axis) is plotted against button position (x-axis).

A simple model may relate the button impedance to the button standoff. The model may be based on an approximation of the button impedance in casing by a parallel plate capacitor where the button surface is one plate and the casing is the other plate. The mud in between may act as a (lossy) dielectric and, therefore, in first order approximation:

$$\text{Zibut} = 1/(i^*\omega \text{ Cibut}), [\text{Ohm}] \quad \text{Equation (59)}$$

with:

$$\text{Cibut} = \epsilon\text{mud}^*\epsilon 0^* \text{Abut/soibut, [F]} \quad \text{Equation (60)}$$

where $\omega$ is the angular frequency, $\epsilon 0$ is the free-space dielectric permittivity, $\epsilon$mud is the relative mud dielectric permittivity and Abut is the button surface area. From this, it may be deduced that the button impedance is approximately proportional to the button standoff:

$$\text{Zibut} = k^*\text{soibut. [Ohm]} \quad \text{Equation (61)}$$

The proportionality provides a way to determine constant k after which somin can be obtained. With $\epsilon 0$, Abut and $\omega$ known, $\epsilon$mud may be determined. The de-averaged standoff may be given by:

$$\text{daso} = \text{soibut (somin)} - \langle \text{soibut (somin)} \rangle, [\text{m}] \quad \text{Equation (62)}$$

Equation (38) shows that daso can be approximated by the following ($\langle x \rangle$ denotes the average of x over the buttons):

$$\text{dasoibut} = \text{soibut (0)} - \langle \text{soibut (0)} \rangle. [\text{m}] \quad \text{Equation (63)}$$

The de-averaged button impedance may be given by:

$$\text{daZibut} = \text{Zibut} - \langle \text{Zibut} \rangle. [\text{Ohm}] \quad \text{Equation (64)}$$

The constant k can now be determined given that k may minimize the sum over the button electrodes of the squared difference between daZibut/k and dasoibut based on the following:

$$k = \arg\min \text{sumibut}\{(\text{daZibut}/k - \text{dasoibut})^2\} \text{ [Ohm/m]} \quad \text{Equation (65)}$$

An algorithm, such as the Golden Section Search, can be used for the minimization.

With the thus-obtained k and Equation (41), the standoff of the button electrodes may be determined. By fitting a quadratic and determining the minimum, somin may also be determined. In addition, $\epsilon$mud may be determined with the obtained value for k together with equations 39-41 and with the help of known $\epsilon 0$, Abut and $\omega$.

Figure 5:
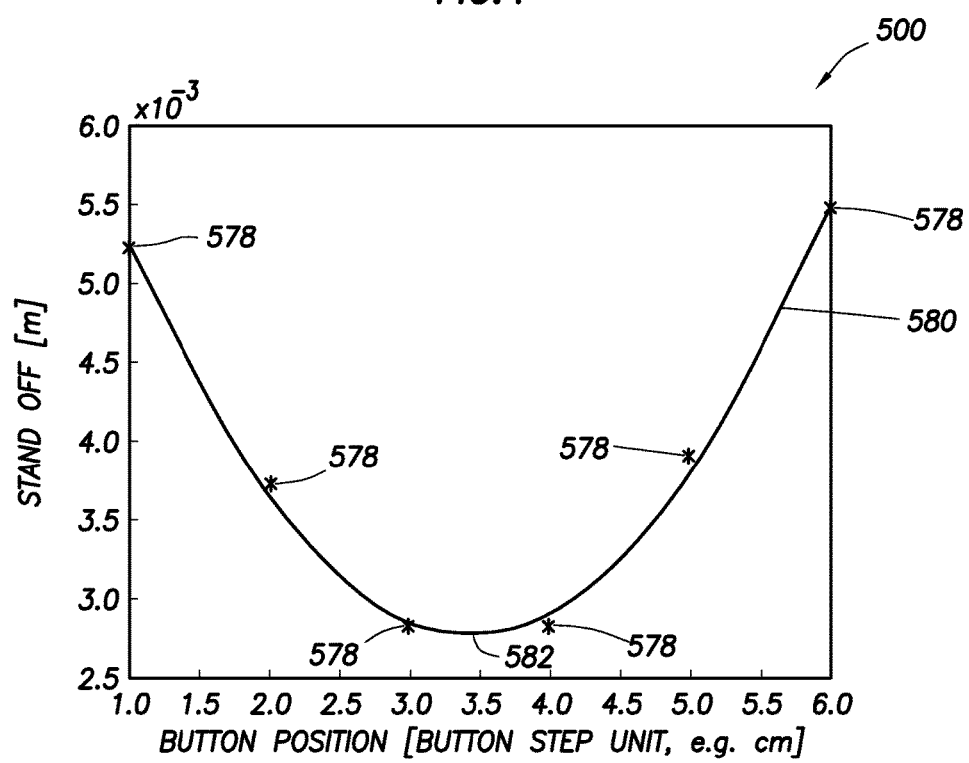
FIG. 5 is a graph depicting curve fitting of standoff for a plurality of button electrodes.

FIG. 5 is a graph 500 depicting final $s_{ibut}$ 578, quadratic curve 580, and minimum 582. In this graph, standoff (y-axis) is plotted against button position (x-axis). In this example, the minimum 582 is at 3.4, $so_{min}$=2.8 mm, and $\epsilon_{mud}$=10.4.

In the curvature mismatch technique, relative errors in the button impedances may not propagate to $so_{min}$, where the different button electrodes have the same relative amplitude error. A relative error in the button impedances may lead to a similar relative error in $\epsilon_{mud}$. Outlier button impedances can be eliminated.

Other fitting functions, including smoothing and interpolation functions, may be used. Other means may be used to determine which button electrode is closest to the formation, e.g. acoustic, mechanical. Other ways of matching $Z_{ibut}$ and $so_{ibut}$, such as fitting a quadratic therethrough and optimizing $so_{min}$ until the $x^2$ terms match, may be used. Using a more complicated model between $Z_{ibut}$ and $so_{ibut}$ e.g., including second order terms and/or potentially based on computer simulations, such as finite elements, may be performed. After finding $so_{min}$, $so_{min\_initial} = so_{min}$ may be set and Equation 37 may be recalculated with the approximation $so_{ibut} (so_{min}) \approx f_{ibut}(\text{casingdiam, crvrad, } so_{min\_initial}, \text{xso}_{min}) + (so_{min} - so_{min\_initial})$. Other geometries (button number, size, spacing, etc.) may be used. The technique may be used, for example, in four terminal measurements with oil based mud (OBMI).

Figure 6:
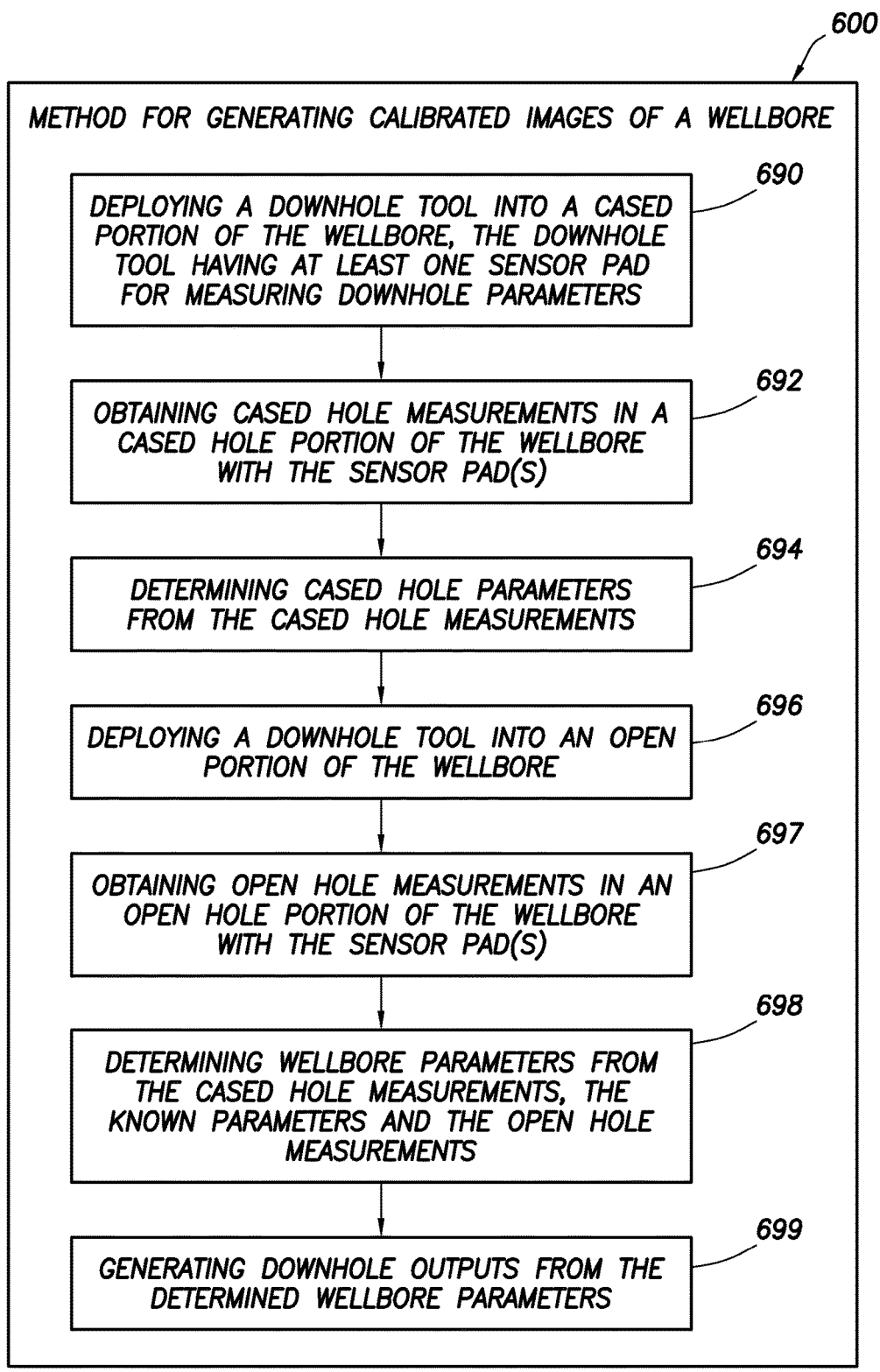
FIG. 6 is a flow chart depicting an example method of generating calibrated images of a wellbore.

FIG. 6 is a flow chart depicting a method 600 of generating calibrated images of a wellbore. The method 600 involves deploying (690) a downhole tool into a cased portion of the wellbore (the downhole tool having at least one sensor pad for measuring downhole parameters), obtaining (692) cased hole measurements in a cased hole portion of the wellbore with the sensor pad(s), and determining (694) cased hole parameters from the cased hole measurements. The method may also involve deploying (696) the downhole tool into an open hole portion of the wellbore, obtaining (697) open hole measurements in an open hole portion of the wellbore with the sensor pad(s), determining (698) open hole parameters from the cased hole parameters, known parameters and the open hole measurements, and generating (699) downhole outputs from the determined open hole parameters. The method may be repeated or performed in any order.

Although only a few example embodiments have been described in detail above, those skilled in the art will readily appreciate that many modifications are possible in the example embodiments without materially departing from this invention. Accordingly, the such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

We claim:

1. A method comprising:
    positioning a pad of a downhole tool at a distance from a conductive surface, wherein the pad is suitable for measuring downhole parameters and wherein the pad comprises at least one button electrode and one or more return electrodes;
    measuring a current at the pad, wherein the current is measured from a current path between the one or more return electrodes, the button electrode and the conductive surface and determining a measured button impedance from the measured current, wherein the button impedance comprises at least one of a measured impedance amplitude and a measured impedance phase; and
    determining a theoretic impedance of the current path based on the distance between the pad and the conductive surface in view of a predetermined model, wherein determining the theoretic impedance comprises determining at least one of a theoretic impedance amplitude and a theoretic impedance phase,
    calibrating the downhole tool by matching at least one of the measured impedance amplitude with the theoretic impedance amplitude and the measured impedance phase with the theoretic impedance phase.

2. The method of claim 1, wherein determining the theoretic impedance comprises determining a theoretic impedance phase and a theoretic impedance amplitude and matching each of the measured impedance amplitude with the theoretic impedance amplitude and the measured impedance phase with the theoretic impedance phase.

3. The method of claim 1, comprising circulating a current between the pad and the conductive surface, such that each current path between each of the one or more return electrodes and the conductive surface represents a capacitor in series with respect to each other current path between each other of the one or more return electrodes and the conductive surface.

4. The method of claim 1, comprising determining the theoretic impedance for multiple distances to the conductive surface.

5. The method of claim 4, comprising:
    disposing spacers having different thicknesses on a surface of the pad for determining the theoretic impedance for multiple distances to the conductive surfaces;
    wherein the method includes:
        for each spacer, positioning the spacer against the conductive surface.

6. The method of claim 4, comprising:
    positioning the pad at different distances from the conductive surface.

7. The method of claim 1, comprising determining temperature variation calibrations.

8. The method of claim 7, wherein determining temperature variation calibrations comprises:
    varying temperature in an environment of the pad and the conductive surface;
    comparing pad measurements with temperature variation; and
    determining temperature variation calibrations based on the differences in pad measurements with respect to temperature variation.

9. The method of claim 1, wherein the theoretic impedance is obtained via the following model:

$$Z=1/(i*\Omega*C_{button\_conductiveSurface})+1/(i*\Omega*C_{return\_conductiveSurface})$$

Wherein Z is the theoretic impedance $C_{button\_conductiveSurface}$ is a capacitor for modelling the current path between button electrode and conductive surface $C_{return\_conductiveSurface}$ is a capacitor for modelling the current path between return electrode and conductive surface $\Omega$ is the angular frequency of the signal.

10. The method according to claim 4, wherein it comprises determining the difference between the theoretic impedances obtained for two different distances and calibrating the tool based on the difference.

* * * * *